US 6,968,547 B2

(12) United States Patent
Cantrill

(10) Patent No.: US 6,968,547 B2
(45) Date of Patent: Nov. 22, 2005

(54) DYNAMIC TRAP TABLE INTERPOSITION FOR EFFICIENT COLLECTION OF TRAP STATISTICS

(75) Inventor: Bryan Cantrill, San Francisco, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 666 days.

(21) Appl. No.: 10/060,883

(22) Filed: Jan. 29, 2002

(65) Prior Publication Data

US 2003/0145251 A1 Jul. 31, 2003

(51) Int. Cl.[7] .................................................. G06F 9/45

(52) U.S. Cl. ...................................... 717/158; 717/150

(58) Field of Search ................................ 717/158, 150

(56) References Cited

U.S. PATENT DOCUMENTS

| | | | | |
|---|---|---|---|---|
| 5,857,097 A | * | 1/1999 | Henzinger et al. | 712/236 |
| 6,006,032 A | * | 12/1999 | Blandy et al. | 717/127 |
| 6,009,514 A | * | 12/1999 | Henzinger et al. | 712/236 |
| 6,112,317 A | * | 8/2000 | Berc et al. | 714/47 |
| 6,253,317 B1 | * | 6/2001 | Knapp et al. | 712/244 |
| 6,275,782 B1 | * | 8/2001 | Mann | 702/182 |
| 6,378,023 B1 | * | 4/2002 | Christie et al. | 710/260 |
| 6,609,083 B2 | * | 8/2003 | Enck et al. | 702/186 |
| 6,662,358 B1 | * | 12/2003 | Berry et al. | 717/128 |
| 6,694,457 B2 | * | 2/2004 | McKee | 714/38 |

OTHER PUBLICATIONS

Jacobson, Quinn; Smith, James E. "Instruction Pre-Processing in Trace Processors", Jan. 1999, IEEE retrieved Nov. 29, 2004.*
Kapur, Hohit; Hay, Cy; Williams, T.W; "The Mutating Metric for Benchmarking Test", p. 18-21, IEEE 2000, retrieved Jan. 19, 1005.*
Martonosi, Margaret; Ofelt, David; Heinrich, Mark; "Integrating Performance Monitoring and Communication in Parallel Computers", p. 138-147, 1996 ACM, retrieved Jan. 19, 2005.*
May, John M; "MPX: Software for Multiplexing Hardware Performance Counters in Multithreaded Programs", 2001 IEEE, retrieved Jan. 19, 2005.*

* cited by examiner

Primary Examiner—Tuan Dam
Assistant Examiner—Mary J. Steelman
(74) Attorney, Agent, or Firm—Martine Penilla & Gencarella, LLP

(57) ABSTRACT

A system and method for monitoring the performance of a computer system by dynamically interposing an instrumented trap table. A base address of a trap table, which may be contained in a trap base address register, may be changed to indicate an instrumented trap table. An instrumented trap table may gather a variety of statistics, including the type of trap and an entry timestamp. An instrumented trap table may then call a non-instrumented trap table to process the trap. A non-instrumented trap table may pass control back to the instrumented trap table to collect further statistics, for example an exit timestamp. An instrumented trap table may then return process flow to the calling routing. In this manner, useful performance statistics may be gathered while trap events are processed by regular, optimized software.

44 Claims, 8 Drawing Sheets

DYNAMIC TRAP TABLE INTERPOSITION FOR EFFICIENT COLLECTION OF TRAP STATISTICS

FIELD OF THE INVENTION

Embodiments of the present invention relate to the general field of computing. More particularly, embodiments of the present invention provide a method and apparatus for monitoring the performance of a computer system.

BACKGROUND ART

In the computing arts, a trap is an event which may be generated entirely by hardware, for example external interrupts, or may be generated by software, for example calls for operating system services. In general, a trap causes system hardware to make an exception to or change the flow of software. The software flow generally may be redirected to a series of software routines, which are designed to handle the particular event that caused the trap. These software routines are commonly referred to as "traps", "trap handlers" or "trap tables", the latter also referring to a collection of individual routines.

Trap events, and processing trap events, are common occurrences on most modern computer systems. As mention previously, traps may be caused by interrupts and operating system requests. Another very common cause of traps is a virtual memory system.

In general, in a virtual memory system, the operating system manages memory as a resource, providing a virtual or idealized view of memory to the non-system level software (for example a user program). In this manner, the user programmer may be isolated from the myriad physical details of the actual memory implementation.

Consequently, when a user program accesses "memory," the operating system must translate the request from a virtual address to a physical address. Generally, this is performed by processing a trap which looks up the physical address from a given virtual address and typically loads the virtual to physical translation into a Translation Lookaside Buffer, or TLB. This process generates large numbers of traps.

Additionally, in many virtual memory systems, all virtual memory addresses may not directly translate to physical memory. The operating system may present a virtual image of memory that is larger than physical memory. The operating system typically will divide memory, both real and virtual, into pages. Through a process known as paging, the operating system may move virtual pages in and out of real memory, generally storing pages taken out of memory on a storage device, for example a rotating magnetic disk. Consequently, the virtual memory system takes on the complexity of managing virtually unlimited amount of memory, simplifying and enabling user software to use large amounts of memory when necessary.

As a result, a TLB trap may request a page of virtual memory that is not currently in real memory. This is generally referred to as a "page fault." The response to a TLB miss is typically to suspend the calling process while the operating system pages the virtual page into real memory, and resume the calling process when the virtual page is available in real memory.

As a consequence of all of these traps, trap behavior and performance is critical to overall system performance. It is not unusual for a computer system to generate and process millions of traps per second. Because of the critical nature of trap processing, a great deal of effort has gone in to optimizing the software involved in such processing.

Despite being a fundamental indicator of system behavior, there has historically been very little insight provided into the frequency and cost of machine-specific traps because they pose monitoring difficulties. The lack of insight has been especially acute on microprocessors that handle TLB misses as software traps. The frequency and duration of traps plays a decisive role in the performance of the memory system.

Conventional performance monitoring techniques generally rely on conditional execution. If an indicator is enabled, performance statistics will be gathered, at the cost of some processing overhead. If disabled, the statistics will not be gathered, thereby introducing very little overhead. Because of the critical nature of trap processing and the large number of traps, however, even the minimal overhead of accessing the indicator and making the decision has introduced an unacceptable delay. Consequently, in the conventional art there has not been an acceptable technique to monitor this critical aspect of system performance.

SUMMARY OF THE INVENTION

Therefore, it would be advantageous to provide a method and system providing for monitoring the trap performance of a computer system, which does not impose a performance overhead when disabled. A further need exists for a method of measuring the effect of the performance monitor itself. A still further need exists for a method of adjusting or modifying system parameters to improve performance, based upon the observations of the performance monitoring system.

Embodiments of the present invention provide a method and system providing for monitoring the trap performance of a computer system, which does not impose a performance overhead when not enabled. Further embodiments of the present invention provide a method of measuring the effect of the performance monitor itself. Still further embodiments of the present invention provide a method of adjusting or modifying system parameters to improve performance, based upon the observations of the performance monitoring system.

Embodiments provide an interposing trap table in which each entry increments a per-trap, in-memory counter and then jumps to the actual, underlying trap table entry. To enable the process, the trap base address is written to point to the interposing trap table. Per processor statistics can be gathered by providing a separate interposing trap table per processor.

A system and method for monitoring the performance of a computer system by dynamically interposing an instrumented trap table are disclosed. A base address of a trap table, which may be contained in a trap base address register, is used as a trap table pointer and may be changed to indicate an instrumented trap table. An instrumented trap table may gather a variety of statistics, including the type of trap and an entry timestamp. Statistics can be compiled on a per trap type basis. An instrumented trap table may then call a non-instrumented trap table to process the trap. A non-instrumented trap table may pass control back to the instrumented trap table to collect further statistics, for example an exit timestamp. An instrumented trap table may then return process flow to the calling routing. In this manner, useful performance statistics may be gathered while trap events are processed by regular, optimized software. When not enabled, the trap table pointer points directly to the non-instrumented trap table.

Another embodiment of the present invention provides for collecting performance statistics on several processors that may comprise a computer system.

In one embodiment of the present invention, performance statistics may be collected for various privilege levels of an operating system. Trap statistics can be distinguished based on kernel trap or user trap.

In another embodiment of the present invention, performance statistics may be collected for various processes running in a computer system.

In yet another embodiment of the present invention, performance statistics may be collected for various page sizes.

In still another embodiment of the present invention, a probe effect of an instrumented trap table may be measured and automatically accounted for in reported statistics.

DETAILED DESCRIPTION OF THE INVENTION

Figure 1:
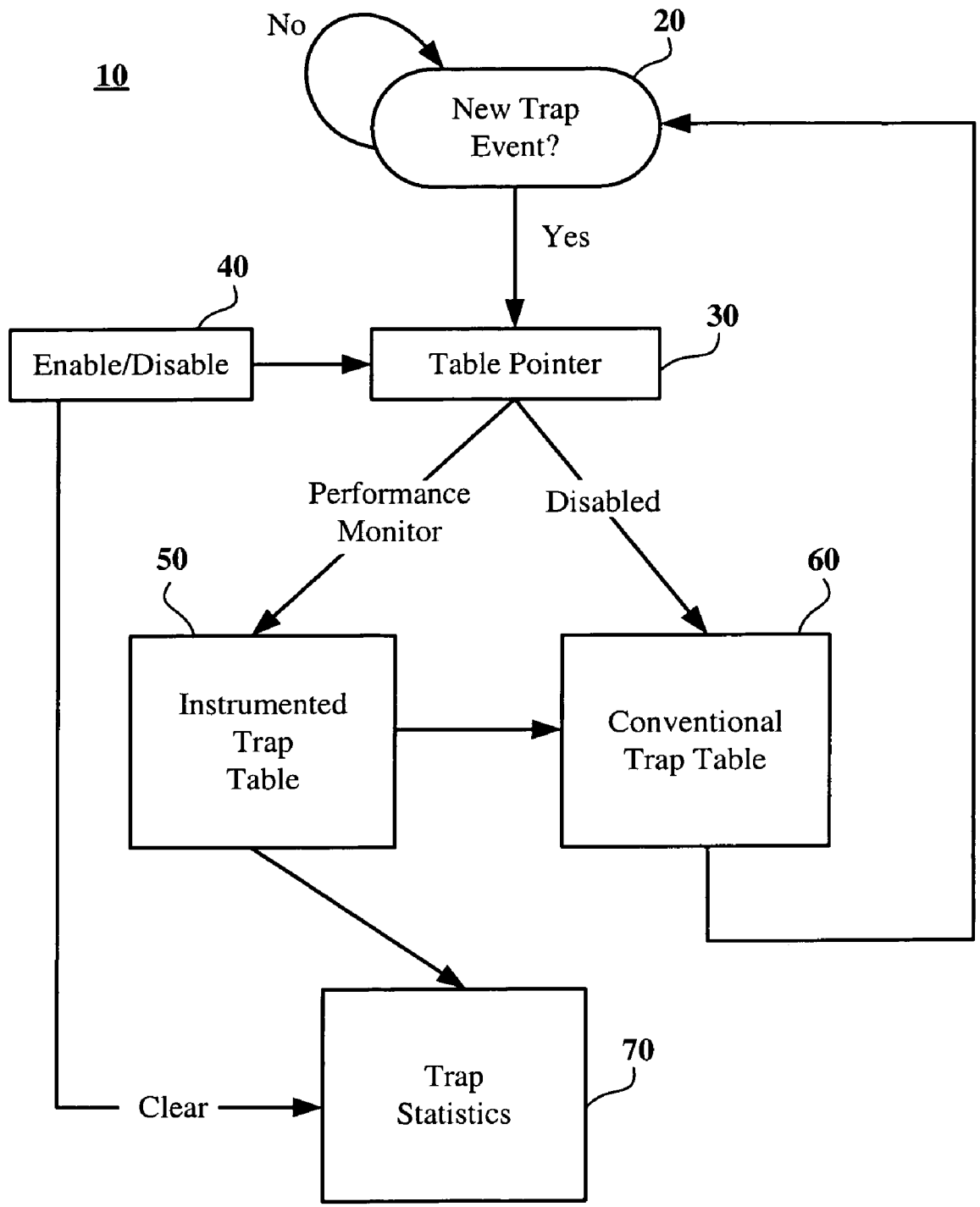
FIG. 1 is a flow diagram of a process for collecting trap statistics, according to an embodiment of the present invention.

In the following detailed description of the present invention, dynamic trap table interposition for efficient collection of trap statistics, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow (e.g., processes 400, 500 and 700) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or "changing" or "executing" or "measuring" or "gathering" or "running" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Dynamic Trap Table Interposition for Efficient Collection of Trap Statistics

The present invention is described in the context of a general purpose computer system. However, it is to be appreciated that the present invention may be utilized in other types of computer systems where it may be desirable to monitor the performance of trap execution.

In the computing arts, a trap is an event which may be generated by hardware, for example external interrupts, or may be generated by software, for example calls for operating system services. In general, a trap causes system hardware to make an exception to, or change, the flow of software. The software flow generally may be redirected to a series of software routines, which are designed to handle the particular event, which caused the trap. These software routines are commonly referred to as traps, trap handlers or trap tables, the latter also referring to a collection of individual routines. A trap table may also be a list of addresses of the trap handling routines.

A virtual memory system generally uses a memory structure known as a Translation Lookaside Buffer (TLB) to lookup the real address from a given virtual address (VA). A Translation Storage Buffer, or TSB, may be a second-level lookup table that resides in memory. Hardware may perform the TSB lookup when the translation cannot be found in the TLB. Each entry in the TSB table is generally called a Translation Table Entry, or TTE. The entry contains translation information for a virtual page.

An embodiment of the present invention may create an interposing trap table in which each entry increments a per-trap, in-memory counter and then jumps to the actual, underlying trap table entry.

FIG. 1 is a flow diagram of a process 10 for collecting trap statistics, according to an embodiment of the present invention.

Process 10 may be entered in response to a trap event, for example a page fault. Step 20 illustrates the entry into the main body of the process. If a trap event in not being handled by embodiments of the present invention, step 20 may loop back to itself.

In response to a trap event, computer hardware may refer to a table pointer 30 that indicates an address of software to handle the trap. In accordance with embodiments of the present invention, table pointer 30 may point to two different trap tables, an instrumented trap table 50, or a conventional (non instrumented) trap table 60.

Step 40 of process 10 determines which trap table, instrumented trap table 50 or conventional (non-instrumented) trap table 60, is indicated by table pointer 30. If the collection of trap statistics 70 is desired, step 40 will cause table pointer 30 to point to instrumented trap table 50. Optionally, step 40 may also clear or reinitialize trap statistics 70.

When instrumented trap table 50 has completed generating or updating trap statistics 70, control is passed to conventional trap table 60 to handle the trap event.

If the collection of trap statistics 70 is not desired, step 40 will cause table pointer 30 to point to conventional trap table 60. At the completion of the execution of instructions in conventional trap table 60, control is passed back to step 20, and process 10 may suspend while waiting for another trap event.

In this novel manner, when trap statistics 70 are not being collected, conventional trap table 60 handles all trap events. Consequently embodiments of the present invention provide the ability to operate with no performance penalty due to instrumented trap table 50.

Figure 7:
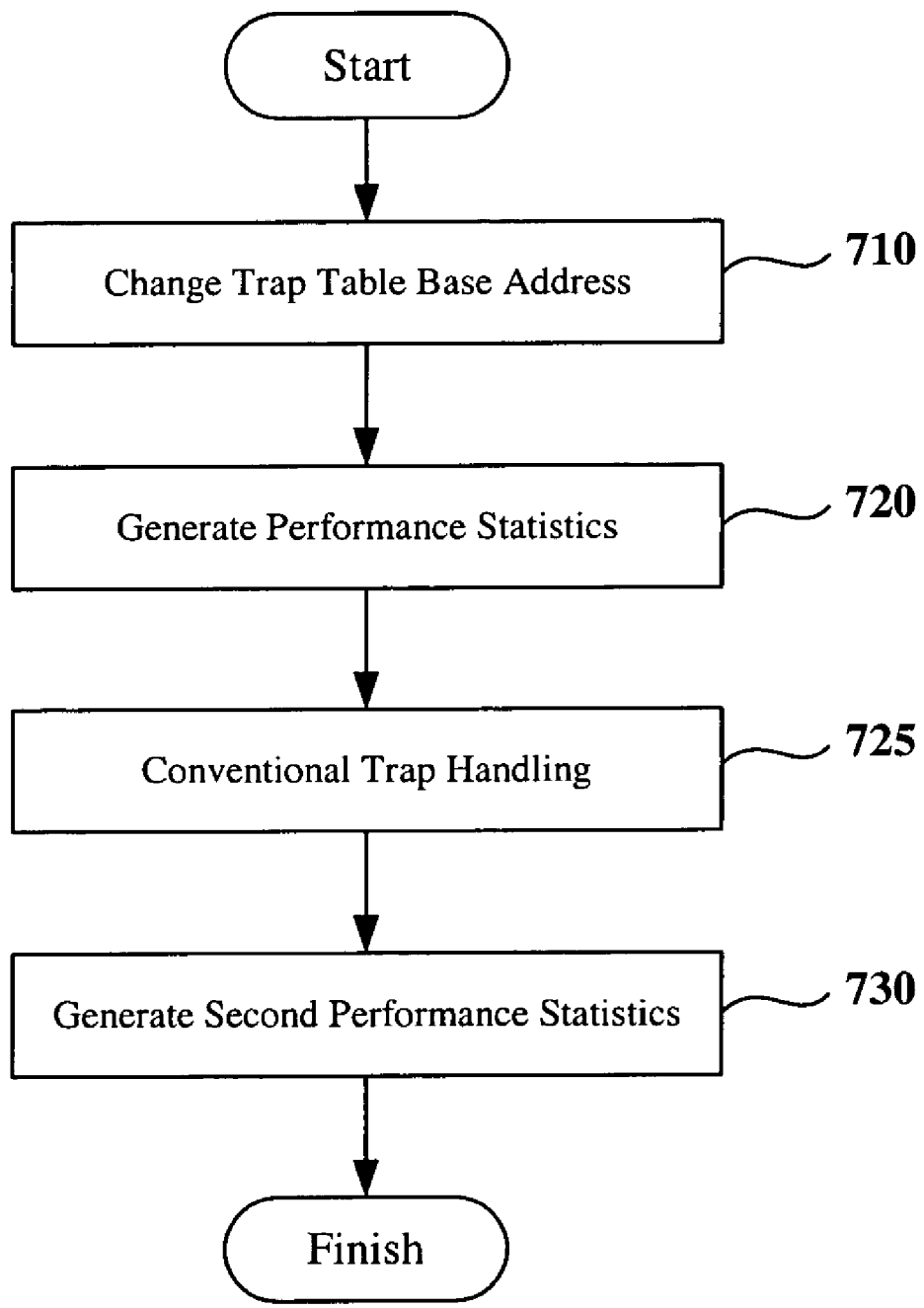
FIG. 7 is a flow diagram of a process for monitoring the performance of a computer system, according to an embodiment of the present invention.

FIG. 7 is a flow diagram of a process 700 for monitoring the performance of a computer system, according to an embodiment of the present invention. A trap base address register is used as a pointer to a trap table. To enable the collection of trap performance statistics, the trap base address (%tba) register may be changed to point to the interposing trap table, as shown in step 710. Step 710 may optionally reset a counter used in step 720. The interposing tap table, or instrumented trap table, is provided by embodiments of the present invention to record trap statistics. When disabled, the original or conventional trap table is the target of the pointer (%tba).

It is appreciated that step 710 as described above changes the trap table address in a pointer register. Another technique well suited to embodiments of the present invention may be to actually change the location in memory of a non-instrumented trap table, without changing the pointer. For example, a non-instrumented trap table may be copied to a new memory location, and an instrumented trap table could be located at the previous memory location of the non-instrumented trap table.

In step 720, an instrumented trap table may execute, generating various useful performance statistics. Such statistics may include without limitation a count of total trap events, a count of each of a plurality of trap types (for example, hardware interrupts and TLB misses), trap types for each of a plurality of privilege levels of an operating system (for example, user and supervisor modes), a count of type types for each of a plurality of processes, a count of TLB misses by page size and a timestamp for entry into the trap table. It is appreciated that other well-known statistics are well suited to embodiments of the present invention. Each of the above statistics can be compiled by providing a separate counter for each.

Importantly, since each central processor (CPU) in a multi-processor computer system, or each computer system in a networked environment processes its own traps, per-CPU (or per-system) performance statistics may be readily obtained by creating a different trap table for each CPU. In this way, all of the above statistics can also be maintained for each CPU.

Still referring to FIG. 7, in step 725 the non-instrumented trap table may actually process the trap.

In optional step 730, the non-instrumented trap table may return control to the instrumented trap table to generate additional performance statistics, including a timestamp of the exit of a trap table. The exit timestamp, in conjunction with an entry timestamp, which may have been created in step 720, may be used to calculate the execution time of a trap table.

It is to be appreciated that embodiments of the present invention may be practiced on a wide variety of well known general purpose computer systems, comprising a variety of well known processors and well known operating systems. In particular, embodiments of the present invention may be practiced on SPARC V9 systems running the SOLARIS operating system, commercially available from Sun Microsystems of California.

As do other well-known processors, SPARC V9 supports nested traps, that is, processing a subsequent trap while already processing an initial trap. The trap level may be kept in the trap level (TL) register. During normal operation TL may be 0 and when a trap is taken, the TL register may be incremented by 1.

Figure 1A:
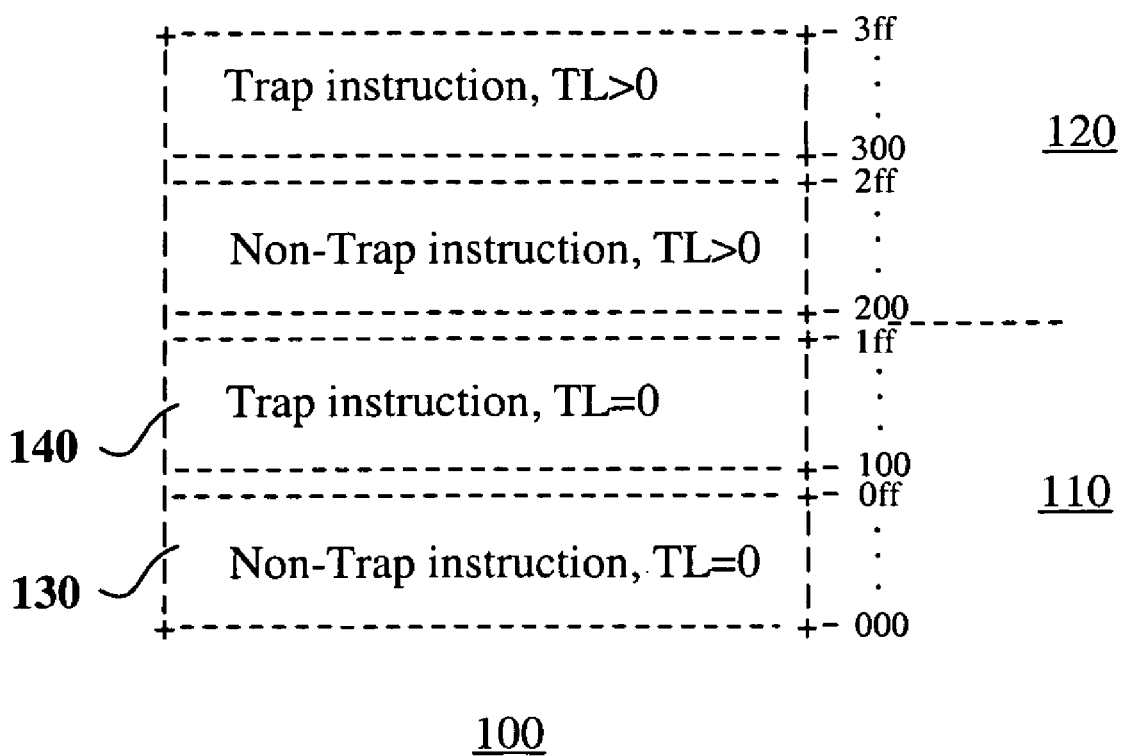
FIG. 1A is an illustration of a memory map of a trap table.

To aid system software, the trap table 100 may be divided into two halves as shown in FIG. 1A. The lower half 110 may contain the trap handlers for traps taken when TL is 0 and the upper half 120 may contain the trap handlers for traps taken when TL is greater than 0.

Each half may be further subdivided into two subsequent halves. The lower half, for example trap table quarter 130, contains the trap handlers for traps other than those induced by the trap instruction, while the upper half, for example trap table quarter 140, contains the trap handlers for traps induced by the trap instruction. This gives a total of four ranges, with each range containing 256 traps.

Figure 2:
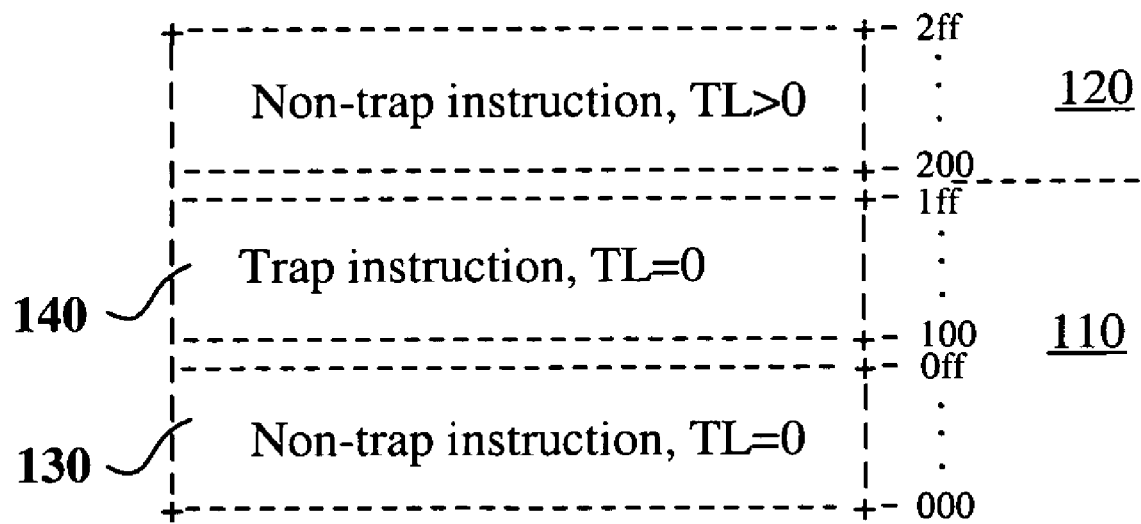
FIG. 2 is an illustration of a memory map of a trap table.

Solaris, however, does not have reason to support trap instructions when TL is greater than zero. FIG. 2 shows a map of an actual trap table 200. Actual trap table 200 contains trap table lower half 110 as before, but the upper region 210 lacks an area for entries when TL is greater than zero from trap instructions.

UltraSPARC defines four sets of global registers: Normal Globals, Alternate Globals (AGs), Memory Management Unit (MMU) Globals (MGs), and Interrupt Globals (IGs).

The set of globals in use may be controlled by bits in PSTATE, the processor state register. When TL is 0 (and PSTATE has not been otherwise explicitly modified), the Normal Globals are in use. When a trap is issued, PSTATE may be modified to point to a set of globals corresponding to the trap type. Most traps correspond to the Alternate Globals, with a minority corresponding to the MMU Globals, and only the interrupt-vector trap (vector 0x60) corresponding to the Interrupt Globals.

It is appreciated that the sets of globals are per trap type, not per trap level. Thus, when executing a TL>0 trap handler, registers may not be available. For example, both trap-instruction traps and spill traps execute on the alternate globals; if a trap-instruction trap induces a window spill, the window spill handler has no available global registers. For embodiments of the present invention, this may be problematic. A register may be required to transfer control from one arbitrary location (in the interposing trap table) to another (in the actual trap table).

This problem may be overcome by exploiting the trap table's location at the bottom of valid kernel memory (e.g., at KERNELBASE). Interposing trap tables may be located just below KERNELBASE thereby allowing the use of a branch-always instruction (ba) instead of a jump instruction (amp) to transfer control from the TL>0 entries in the interposing trap table to the TL>0 entries in the actual trap table.

Figure 3:
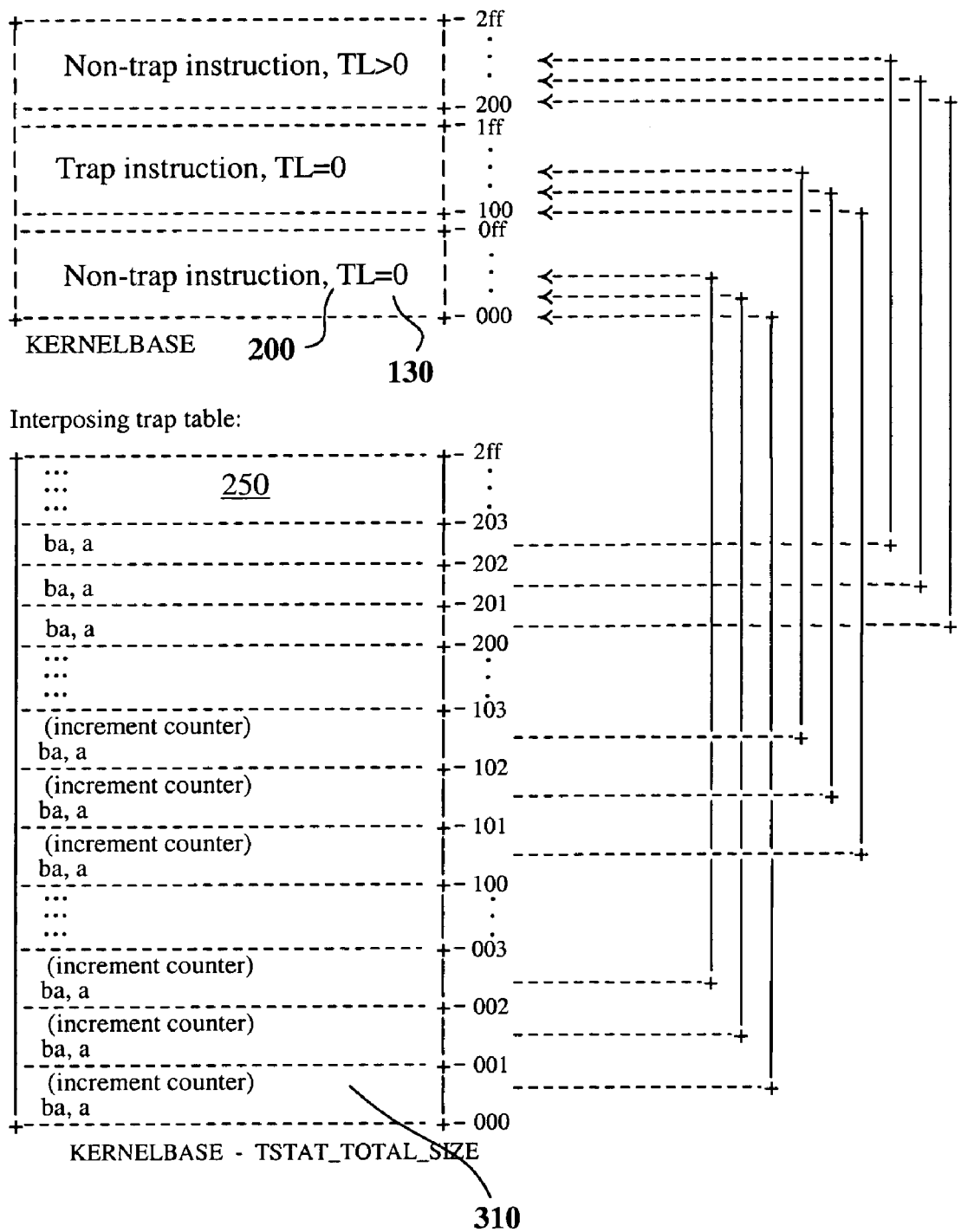
FIG. 3 is an illustration of a memory map of a trap table and an interposing trap table, according to an embodiment of the present invention.

FIG. 3 illustrates a memory map of the relation between an actual trap table 200 and an interposing trap table 250. For example, interposing trap table entry 310 points to non-trap instruction, TL=0 region 130 of the actual trap table 200.

TSTAT_TOTAL_SIZE is the number of pages required for each trap table.

Because TLB misses are an important component of system performance, it is important to know much more about these traps than simply the number received. It is desirable to understand the amount of time spent executing the TLB miss handler, TLB misses versus TSB misses, kernel-level misses versus user-level misses and misses per page size. It is appreciated that the collection of other well know statistics related to TLB misses is well suited to embodiments of the present invention.

The amount of time spent executing the TLB miss handler may be accurately determined by generating a timestamp on trap entry and trap exit, and subtracting the latter from the former, and adding the result to an accumulating count.

Figure 4:
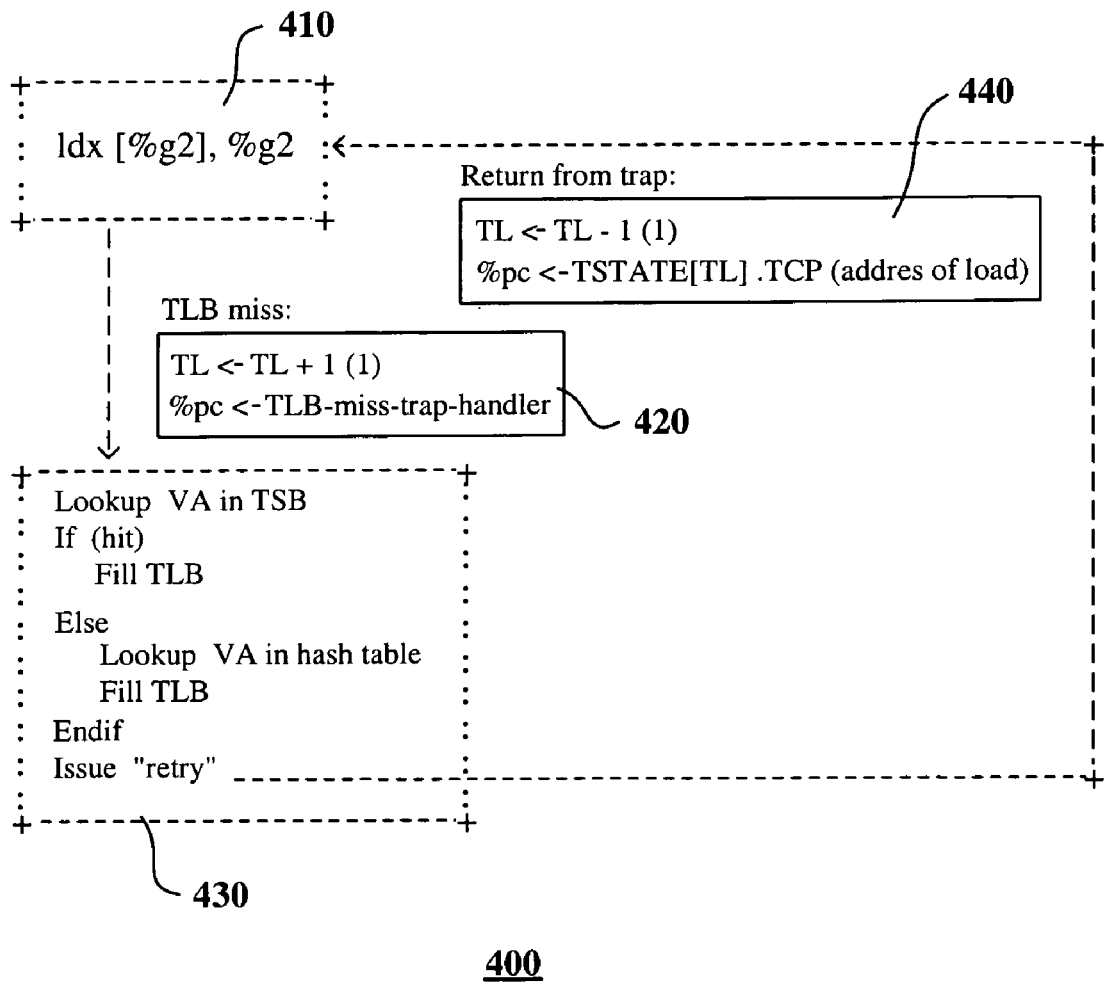
FIG. 4 is an illustration of the flow of a process for determining the time of entry for processing a translation lookaside buffer miss, according to an embodiment of the present invention.

FIG. 4 is an illustration of the flow of a process 400 for determining the time of entry for processing a translation lookaside buffer miss, according to an embodiment of the present invention.

An instruction (ldx, %g2) may cause a TLB miss in step 410. Responsive to the TLB miss, in step 420 the TL register is incremented and the program counter is loaded with the address of the TLB miss-trap-handler in step 420.

In step 430, the trap may be handled. In this example, the virtual address may be looked up in a Translation Software Buffer (TSB). If found, then a Translation Lookaside Buffer (TLB) may be filled. If the virtual address was not found, then it may be looked up in a hash table and filled.

After completion of step 430, process flow continues to step 440, where the TL register may be decremented and the program counter loaded with the address of the instruction 410. With the TLB loaded, instruction 410 may now complete.

However, interposing on the trap table may only allow the generation of a timestamp on trap entry. When the TLB miss handler has completed filling the TLB, a "retry" may be issued, and control will transfer immediately back to the instruction that generated the miss.

To obtain a timestamp on trap exit, it may be necessary to interpose between the "retry" and the subsequent control transfer to the TLB-missing instruction. Pushing a trap level may enable such an interposition. By raising TL and setting the %tpc to be within a memory range controlled by embodiments of the present invention (the "TLB return entry") and branching to the underlying TLB miss handler, a TLB miss may be simulated. When the TLB miss handler issues its "retry", control will transfer not to the TLB-missing instruction, but rather to the TLB return entry. This code may then obtain a timestamp, and may issue its own "retry" thereby correctly returning to the TLB-missing instruction.

Figure 5:
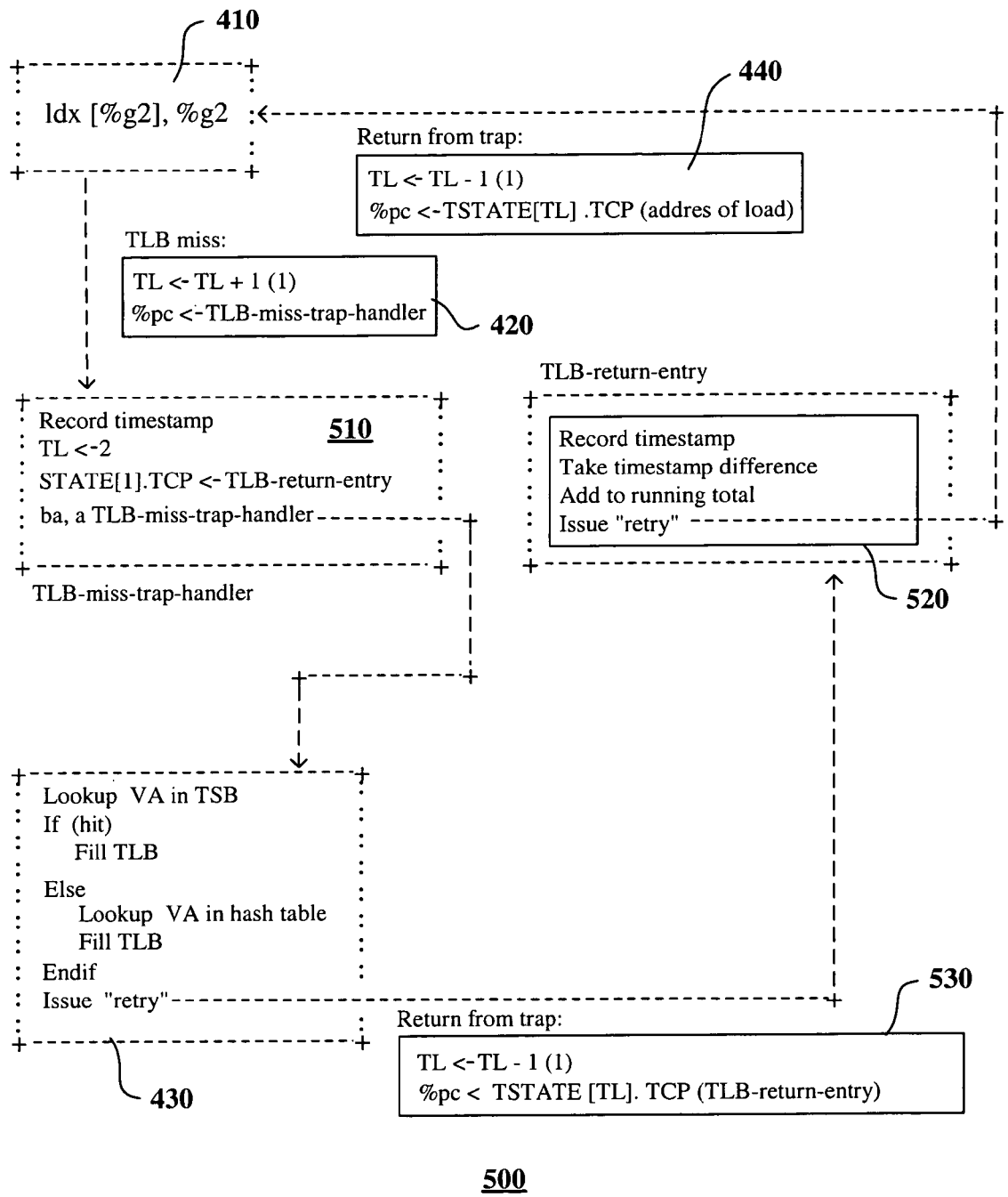
FIG. 5 is an illustration of the flow of a process for determining the time spent processing a translation lookaside buffer miss, according to an embodiment of the present invention.

FIG. 5 is an illustration of the flow of a process 500 for determining the time spent processing a translation lookaside buffer miss, according to an embodiment of the present invention.

As described in the description of process 400 above, an instruction (Idx[%g2], %g2) may cause a TLB miss in step 410. Responsive to the TLB miss, in step 420 the TL register is incremented and the program counter is loaded with the address of the TLB miss-trap-handler in step 420.

Referring to FIG. 5, step 510 may record an entry timestamp, increment the TL register and loads the TLB-return entry value into the program counter. In this manner, the trap handler will return to the TLB-return entry, rather than to instruction 410, as occurred in process 400.

In step 430 of process 500, the trap may be handled. In this example, the virtual address may be looked up in a Translation Software Buffer (TSB). If found, then a Translation Lookaside Buffer (TLB) may be filled. If the virtual address was not found, then it may be looked up in a hash table and filled.

After completion of step 430, process flow continues to step 520, where the TL register may be decremented and the program counter loaded with the address of the TLB-return entry.

Still referring to FIG. 5, in step 520 an exit timestamp may be generated. In addition, a difference between an entry timestamp and an exit timestamp may be computed, and may be added to a running total. Step 520 may issue a retry command, which transfers control to step 440.

In step 440, the TL register may be decremented and the program counter loaded with the address of the instruction 410. With the TLB loaded, instruction 410 may now complete. In this novel manner the regular system software may handle the TLB miss and the time spent handling the miss may be determined.

If an instruction causes a miss in the TLB and in the TSB, and the subsequent hash lookup fails (that is, if there is no valid translation for the TLB-missing address), system software will need to accurately determine the %tpc as part of its page fault handling. The OS kernel may be modified to check the %tpc in this case. If the %tpc falls within the VA range controlled by embodiments of the present invention and the TL may be 2, TL may be simply lowered back to one in step 530.

Lowering TL to 1 has the effect of discarding the state pushed by embodiments of the present invention.

Distinguishing TLB misses from TSB misses requires further interposition on the TLB miss handler since the system does not know a priori or a posteriori if a given virtual address (VA) will or has hit in the TSB.

This distinction may be determined by adding a second TLB return entry almost identical to the first differing only in the address to which it stores its results. The kernel's TLB miss handler may be modified such that it checks the %tpc when it determines that a TLB miss has subsequently missed in the TSB. If the %tpc lies within a VA range and TL is 2 (that is, if embodiments of the present invention are running), the TLB miss handler may increment the %tpc by the size of the TLB return entry. The ensuing "retry" will thus transfer control to the second TLB return entry, and the time spent in the handler will be accumulated in a memory location specific to TSB misses.

In order to minimize the amount of knowledge the kernel must have of embodiments of the present invention, the kernel may not be allowed to hard-code the size of the TLB return entry. Rather, it executes a known instruction at a given memory location with the %tpc in a specific register, for example register %g7. If embodiments of the present invention are not running, this instruction may be the harmless TSTAT__TSBMISS__INSTR ("add %g7, 0, %g7"). Prior to execution, embodiments of the present invention may modify this instruction such that its size equals the size of the TLB return entry.

Differentiating user-level misses from kernel-level misses employs a similar technique, but may be simplified by the ability to distinguish a user-level miss from a kernel-level miss a priori by reading the context register: Embodiments of the present invention implement kernel-/user-level differentiation by again doubling the number of TLB return entries, and setting the %tpc to the appropriate TLB return entry in the instrumented trap table's TLB miss handler. Together with the doubling of entries required for TLB-miss/TSB-miss differentiation, this yields a total of four TLB return entries: a kernel TSB hit, a kernel TSB miss, a user TSB hit and a user TSB miss.

As with the TLB-/TSB-miss differentiation, there may be no way of determining page size a priori. This may therefore be implemented by mandating a new rule: whenever the kernel fills the TLB in its TLB miss handler, the TTE corresponding to the TLB-missing VA must be in %g5 when the handler executes its "retry". This allows the TLB return entry to determine pagesize by simply looking at the page size field in the TTE stored in %g5.

Gathering TLB statistics by pushing a trap level induces significant probe effect or overhead. In other words, the act of measuring affects the measurement. To account for this probe effect, embodiments of the present invention may calibrate the effect of generating and gathering statistics by executing a code sequence with a known number of TLB misses both before and after interposing on the trap table.

This allows embodiments of the present invention to determine a per-trap probe effect that may then be automatically factored into the performance statistics presented to a user.

Figure 6:
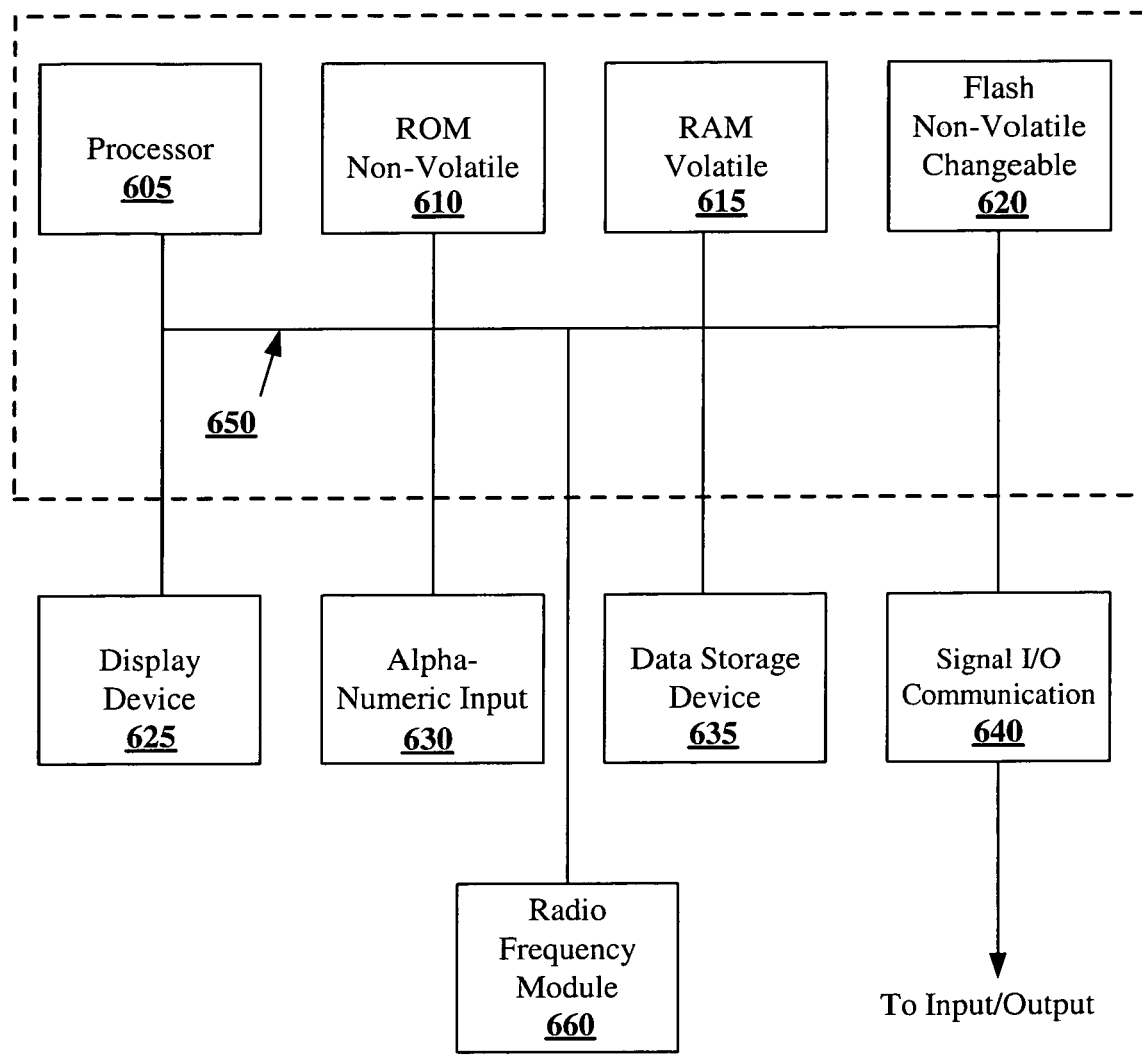
FIG. 6 is a block diagram of a computer system, which may be used as a platform to implement embodiments of the present invention.

FIG. 6 illustrates circuitry of computer system 600, which may form a platform for the implementation of embodiments of the present invention. Computer system 600 includes an address/data bus 650 for communicating information, a central processor 605 functionally coupled with the bus for processing information and instructions, a volatile memory 615 (e.g., random access memory RAM) coupled with the bus 650 for storing information and instructions for the central processor 605 and a non-volatile memory 610 (e.g., read only memory ROM) coupled with the bus 650 for storing static information and instructions for the processor 605. Computer system 600 also optionally includes a changeable, non-volatile memory 620 (e.g., flash) for storing information and instructions for the central processor 605, which can be updated after the manufacture of system 600.

Computer system 600 also optionally includes a data storage device 635 (e.g., a rotating magnetic disk) coupled with the bus 650 for storing information and instructions.

Also included in computer system 600 of FIG. 6 is an optional alphanumeric input device 630. Device 630 can communicate information and command selections to the central processor 605. Device 630 may take the form of a touch sensitive digitizer panel or typewriter-style keyboard. Display device 625 utilized with the computer system 600 may be a liquid crystal display (LCD) device, cathode ray tube (CRT), field emission device (FED, also called flat panel CRT), light emitting diode (LED), plasma display device, electro-luminescent display, electronic paper or other display device suitable for creating graphic images and alphanumeric characters recognizable to the user. Optional signal input/output communication device 640 is also coupled to bus 650. Device 640 may be a network interface card configured for various well known networks, either for the local area or for longer distances, including without limitation ethernet and token ring.

System 600 optionally includes a radio frequency module 660, which may implement a variety of wireless protocols, for example IEEE 802.11 or Bluetooth.

The preferred embodiment of the present invention a system and method for dynamic trap table interposition for efficient collection of trap statistics is thus described. While the present invention has been described in particular embodiments, it should be appreciated that the present invention should not be construed as limited by such embodiments, but rather construed according to the below claims.

What is claimed is:

1. A computer system for gathering performance statistics comprising:
    a first trap table for responding to trap events, said first trap table comprising addresses of a plurality of trap handling routines;
    a second trap table for gathering trap statistics and for referencing said first trap table, said second trap table comprising a plurality of counters for maintaining counts of different trap types for encountered trap events;
    a pointer for selecting between said first and second trap tables, wherein said pointer indicates said second trap table when trap statistic gathering is enabled and otherwise indicates said first trap table; and
    control logic for switching said pointer.

2. The method as described in claim 1 wherein said statistics comprise a count of each of a plurality of trap types for each of a plurality of privilege levels of an operating system.

3. The method as described in claim 1 wherein said statistics comprise a count of traps by page size due to translation look aside buffer miss events.

4. The method as described in claim 1 wherein said statistics include the time spent processing a trap event.

5. A method for monitoring the performance of a computer system comprising:
    a) changing a base address of a trap table from a first address to a second address;
    b) executing trap instructions of an instrumented trap table to generate performance statistics; and
    c) responsive to said b), transferring control, by a table pointer, to a non-instrumented trap table, wherein the non-instrumented trap table is capable of responding to trap events.

6. The method as described in claim 5 further comprising:
    d) responsive to said a), resetting a performance statistics counter.

7. The method as described in claim 5 further comprising performing said a) through c) on a plurality of processors comprising a computer system.

8. The method as described in claim 7 wherein said statistics are collected for each of said plurality of processors.

9. The method as described in claim 5 wherein said statistics include the time spent processing a trap event.

10. The method as described in claim 5 wherein said base address is contained in a trap base address register.

11. The method as described in claim 5 wherein said statistics comprise a count of trap events.

12. The method as described in claim 5 wherein said statistics comprise a count of each of a plurality of trap types.

13. The method as described in claim 5 wherein said statistics comprise a count of each of a plurality of trap types for each of a plurality of privilege levels of an operating system.

14. The method as described in claim 5 wherein said statistics comprise a count of each of a plurality of trap types for each of a plurality of processes.

15. The method as described in claim 5 wherein said statistics comprise a count of traps by page size due to translation look aside buffer miss events.

16. The method as described in claim 5 wherein said statistics are stored in a computer readable medium.

17. The method as described in claim 5 wherein said second address is an address of said instrumented trap table.

18. A method of monitoring the performance of a computer system comprising:
   a) changing a base address of a trap table from a first address to a second address;
   b) executing instructions of an instrumented trap table to generate first performance statistics;
   c) responsive to said b), transferring control, by a table pointer, to instructions of a noninstrumented trap table for responding to trap events; and
   d) responsive to said c), transferring control, by said table pointer, to instructions of said instrumented trap table to generate second performance statistics.

19. The method as described in claim 18 wherein said first performance statistics comprise a first timestamp of entry into said instrumented trap table and said second performance statistics comprise a second timestamp of exit from said instrumented trap table.

20. The method as described in claim 19 wherein duration of execution of a trap is computed by calculating a difference between said second timestamp and said first timestamp.

21. The method as described in claim 20 wherein said first performance statistics comprise a first timestamp of entry into said non-instrumented trap table and said second performance statistics comprise a second timestamp of exit from said non-instrumented trap table.

22. The method as described in claim 21 wherein duration of execution of a trap is computed by calculating the difference between said second timestamp and said first timestamp.

23. The method as described in claim 18 further comprising performing said a) through d) on a plurality of processors comprising a computer system.

24. The method as described in claim 18 wherein said first statistics and said second statistics comprise a count of trap events.

25. The method as described in claim 18 wherein said first statistics and said second statistics comprise a count of each of a plurality of trap types.

26. The method as described in claim 18 wherein said first statistics and said second statistics comprise a count of each of a plurality of trap types for each of a plurality of privilege levels of an operating system.

27. The method as described in claim 18 wherein said first statistics and said second statistics comprise a count of each of a plurality of trap types for each of a plurality of processes.

28. The method as described in claim 27 wherein said first statistics and said second statistics are collected for each of said plurality of processors.

29. The method as described in claim 18 wherein said first statistics and said second statistics are stored in a computer readable medium.

30. The method as described in claim 18 wherein said first statistics and said second statistics comprise a count of traps by page size due to page miss events.

31. The method as described in claim 18 wherein said second address is an address of said instrumented trap table.

32. A method of determining the overhead of performance monitoring comprising:
   a) measuring a first time to execute a first number of traps without performance monitoring, the first number of traps being processed by a first trap table;
   b) computing a first average time by dividing said time by said first number; and
   c) measuring a second time to execute a second number of traps with performance monitoring, the second number of trap being processed by a second trap table, wherein the measuring of the first time or the second time is being directed by a table pointer;
   d) computing a second average time by dividing said time by said second number; and
   e) calculating the overhead as the difference between said first average time and said second average time.

33. A method of optimizing performance in a computer system comprising:
   a) selecting by a table pointer between a non-instrumented trap table for responding to trap events and an instrumented trap table for gathering trap statistics;
   b) gathering trap statistics; and
   c) responsive to said b), modifying a system parameter to improve said statistics, wherein said modifying optimizes performance.

34. The method as described in claim 33 wherein said parameter is page size.

35. The method as described in claim 33 wherein said parameter is a processor performing a task.

36. A method for monitoring the performance of a computer system comprising:
   a) changing a base address of a trap table by a table pointer from a first address associated to a non-instrumented trap table to a second address associated to an instrumented trap table for invoking trap statistics collection;
   b) executing the instrumented trap table to generate said trap statistics; and
   c) displaying said trap statistics in visual form.

37. The method as described in claim 36 wherein said trap statistics comprise a count of trap events.

38. The method as described in claim 36 wherein said trap statistics comprise a count of each of a plurality of trap types.

39. The method as described in claim 36 wherein said trap statistics comprise a count of each of a plurality of trap types for each of a plurality of privilege levels of an operating system.

40. The method as described in claim 36 wherein said trap statistics comprise a count of each of a plurality of trap types for each of a plurality of processes.

41. The method as described in claim 36 wherein said trap statistics comprise a count of traps by page size due to translation look aside buffer miss events.

42. The method as described in claim 36 wherein said trap statistics are collected for each of a plurality of processors.

43. The method as described in claim 36 wherein said trap statistics comprise the time spent processing a trap event.

44. A system comprising:
   a processor coupled to a bus; and a memory coupled to said bus and wherein said memory contains instructions that when executed implement a method for monitoring the performance of a computer system, said method comprising:

a) changing a base address of a trap table by a table pointer from a first address associated to a non-instrumented trap table to a second address associated to an instrument trap table; and b) executing the instrumented trap table to generate performance statistics.

* * * * *